(12) United States Patent
Uda et al.

(10) Patent No.: US 10,476,402 B2
(45) Date of Patent: Nov. 12, 2019

(54) POWER CONVERTER

(71) Applicant: MITSUBISHI ELECTRIC CORPORATION, Chiyoda-ku, Tokyo (JP)

(72) Inventors: Ryosuke Uda, Tokyo (JP); Kenichi Kuroda, Tokyo (JP); Masashi Kitayama, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 416 days.

(21) Appl. No.: 15/510,762

(22) PCT Filed: Oct. 8, 2014

(86) PCT No.: PCT/JP2014/076894
§ 371 (c)(1),
(2) Date: Mar. 13, 2017

(87) PCT Pub. No.: WO2016/056072
PCT Pub. Date: Apr. 14, 2016

(65) Prior Publication Data
US 2017/0288569 A1    Oct. 5, 2017

(51) Int. Cl.
*H02J 1/10* (2006.01)
*H02M 7/23* (2006.01)
(Continued)

(52) U.S. Cl.
CPC ............ *H02M 7/23* (2013.01); *H02M 1/32* (2013.01); *H02M 7/483* (2013.01); *H02M 7/537* (2013.01); *H02M 2007/4835* (2013.01)

(58) Field of Classification Search
CPC .......... H02M 1/32; H02M 7/23; H02M 7/483; H02M 7/537; H02M 2007/4835
(Continued)

(56) References Cited

U.S. PATENT DOCUMENTS

2013/0215658 A1  8/2013  Jakob et al.
2013/0328541 A1  12/2013  Euler et al.
(Continued)

FOREIGN PATENT DOCUMENTS

CN   102281014 A   12/2011
CN   104009446 A   8/2014
(Continued)

OTHER PUBLICATIONS

Son et al., "Design and Control of a Modular Multilevel HVDC Converter With Redundant Power Modules for Noninterruptible Energy Transfer", IEEE Transactions on Power Delivery, Jul. 1, 2012, vol. 27, No. 3, pp. 1611-1619.
(Continued)

*Primary Examiner* — Rexford N Barnie
*Assistant Examiner* — Toan T Vu
(74) *Attorney, Agent, or Firm* — Buchanan Ingersoll & Rooney PC

(57) ABSTRACT

In a multilevel converter, three switches are connected between three arms and three reactors, and three resistive elements are connected to the respective three switches in parallel. The three switches are configured to be in a conductive state during a normal operation. The three switches are configured to come into a non-conductive state when a short circuit accident occurs between two DC power transmission lines, whereby an inter-arm direct current flowing in four arms and the like is quickly attenuated by the three resistive elements.

9 Claims, 13 Drawing Sheets

(51) Int. Cl.
*H02M 1/32* (2007.01)
*H02M 7/537* (2006.01)
*H02M 7/483* (2007.01)

(58) Field of Classification Search
USPC .......................................................... 307/43
See application file for complete search history.

(56) References Cited

U.S. PATENT DOCUMENTS

2015/0333660 A1* 11/2015 Kim ................. H02M 1/32
363/123
2017/0047727 A1 2/2017 Cao et al.

FOREIGN PATENT DOCUMENTS

| EP | 3107172 A1 | 12/2016 |
|---|---|---|
| JP | 2012-228025 A | 11/2012 |
| JP | 5622978 B1 | 11/2012 |
| JP | 2013-169088 A | 8/2013 |
| JP | 2013-255422 A | 12/2013 |
| WO | 2013/064310 A1 | 5/2013 |
| WO | WO 2015/121983 A1 | 8/2015 |

OTHER PUBLICATIONS

Extended European Search Report dated Apr. 13, 2018, issued by the European Patent Office in corresponding European Application No. 14903743.4. (8 pages).

Office Action (Communication pursuant to Article 94(3) EPC) dated Sep. 19, 2018, by the European Patent Office in corresponding European Patent Application No. 14903743.4. (5 pages).

International Search Report (PCT/ISA/210) dated Dec. 9, 2014, by the Japanese Office as the International Searching Authority for International Application No. PCT/JP2014/076894.

Written Opinion (PCT/ISA/237) dated Dec. 9, 2014, by the Japanese Patent Office as the International Searching Authority for International Application No. PCT/JP2014/076894.

* cited by examiner

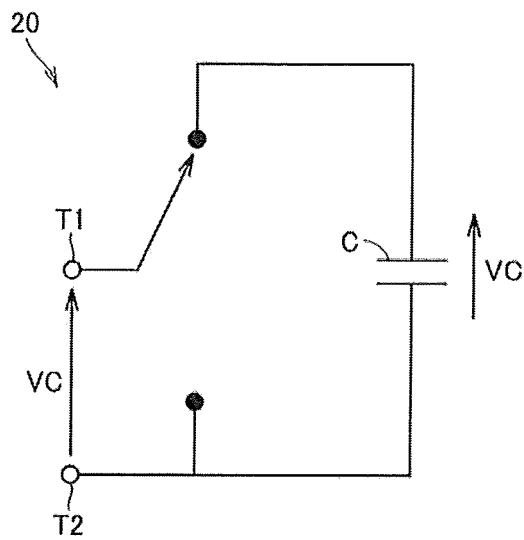
FIG. 4(a) ON STATE
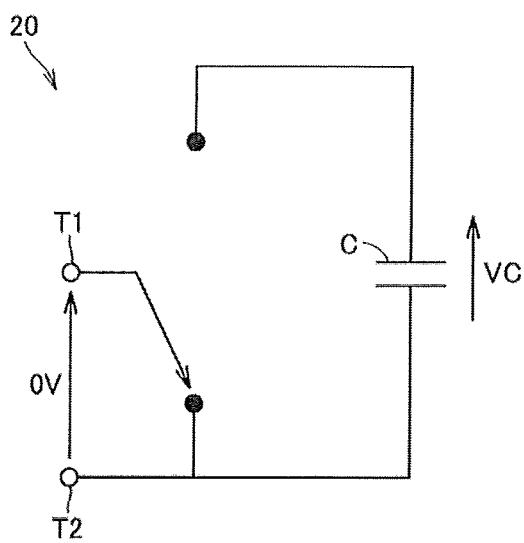
FIG. 4(b) ON STATE $\omega t = 0 \sim \frac{\pi}{2}$ $\omega t = \frac{\pi}{2} \sim \pi$ $\omega t = \pi \sim \dfrac{3\pi}{2}$ $\omega t = \dfrac{3\pi}{2} \sim 2\pi$

POWER CONVERTER

TECHNICAL FIELD

The present invention relates to a power converter, particularly, a power converter configured to transmit and receive power between an AC power supply and a DC power supply.

BACKGROUND ART

A half bridge type modular multilevel converter, which is a conventional power converter, includes: a first arm connected between a positive voltage terminal and an AC terminal; and a second arm connected between the AC terminal and a negative voltage terminal, each of the first and second arms including a plurality of unit cells connected in cascade.

Each of the unit cells includes: a capacitor configured to be charged to a DC voltage; first and second switching elements connected in series between positive electrode and negative electrode of the capacitor; and first and second diodes respectively connected to the first and second switching elements in antiparallel. In each of the arms, the second switching elements of the plurality of unit cells are connected in series. By controlling the plurality of unit cells in each arm, one of DC power and AC power can be converted into the other of the DC power and the AC power (for example, see Patent Document 1 (Japanese Patent Laying-Open No. 2012-228025)).

CITATION LIST

Patent Document

PTD 1: Japanese Patent Laying-Open No. 2012-228025

SUMMARY OF INVENTION

Technical Problem

When a short circuit accident occurs in a DC power transmission line in a DC power transmission system including such a multilevel converter, a large line direct current flows in the first or second switching element of each unit cell (see FIG. 8).

The first and second switching elements of each unit cell can be protected by interrupting the first and second switching elements upon the occurrence of the short circuit accident; however, the line direct current continues to flow in the second diode of each unit cell. Accordingly, a technique of protecting the second diode is required.

As the technique of protecting the second diode, the following procedure is considered: when a short circuit accident occurs, the first and second switching elements are brought into the non-conductive state and a mechanical bypass switch, connected to the second diode in parallel, is brought into the conductive state before the second diode is damaged by the line direct current. According to this procedure, the line direct current is transferred to the mechanical bypass switch, thereby protecting the first and second switching elements and the second diode.

However, when the mechanical bypass switches of all the unit cells are brought into the conductive state, each of the first and second arms is brought into the conductive state, with the result that an inter-arm direct current starts to circulate in a path including two groups each constituted of first and second arms (see FIG. 10). In order to recover the DC power transmission system immediately from a short circuit accident, the line direct current and the inter-arm direct current need to be removed immediately.

By interrupting the supplying of the AC power to the multilevel converter, the supplying of the line direct current is interrupted, whereby the line direct current is attenuated by arc resistance of the point of accident. The inter-arm direct current is attenuated at a time constant determined by a ratio of inductance to resistance value of the multilevel converter. However, in the DC power transmission system, since the resistance value is made small in order to reduce power loss, it takes a long time to attenuate the inter-arm direct current, disadvantageously.

Accordingly, the present invention has a main object to provide a power converter capable of quickly attenuating an inter-arm direct current generated upon a short circuit accident.

Solution to Problem

A power converter according to the present invention is a power converter configured to transmit and receive power between an AC power supply and a DC power supply, the power converter including: first and second DC terminals configured to transmit and receive DC power to and from the DC power supply; an AC terminal configured to transmit and receive AC power to and from the AC power supply; a first arm connected between the first DC terminal and the AC terminal; and a second arm connected between the AC terminal and the second DC terminal. Each of the first and second arms includes a plurality of unit cells connected in cascade. Each unit cell includes a capacitor, first and second switching elements, first and second diodes, and a mechanical bypass switch, the capacitor being configured to be charged to a predetermined DC voltage, the first and second switching elements being connected in series between electrodes of the capacitor, the first and second diodes being respectively connected to the first and second switching elements in antiparallel, the mechanical bypass switch being connected to the first or second diode in parallel. The mechanical bypass switches of the plurality of unit cells are connected in series in each of the first and second arms. The first and second switching elements of each unit cell are configured to alternately come into a conductive state during a normal operation, both the first and second switching elements of each unit cell being configured to come into a non-conductive state when a short circuit accident occurs at the DC power supply side. The mechanical bypass switch of each unit cell is configured to be in the non-conductive state during the normal operation, and is configured to come into the conductive state when the short circuit accident occurs. The power converter further includes: a switch connected between the first and second DC terminals in series with the first and second arms, the switch being configured to be in the conductive state during the normal operation, the switch being configured to come into the non-conductive state when the short circuit accident occurs; and a resistive element connected to the switch in parallel, the resistive element being configured to attenuate a current flowing in the first and second arms when the switch is brought into the non-conductive state.

Advantageous Effects of Invention

In the power converter according to the present invention, since the resistive element is connected to the first and second arms in series when a short circuit accident occurs, the inter-arm direct current can be attenuated quickly.

BRIEF DESCRIPTION OF DRAWINGS

FIGS. 4(a) and 4(b) are a circuit diagram showing an operation of the unit cell shown in FIG. 2.

DESCRIPTION OF EMBODIMENTS

First Embodiment

Figure 1:
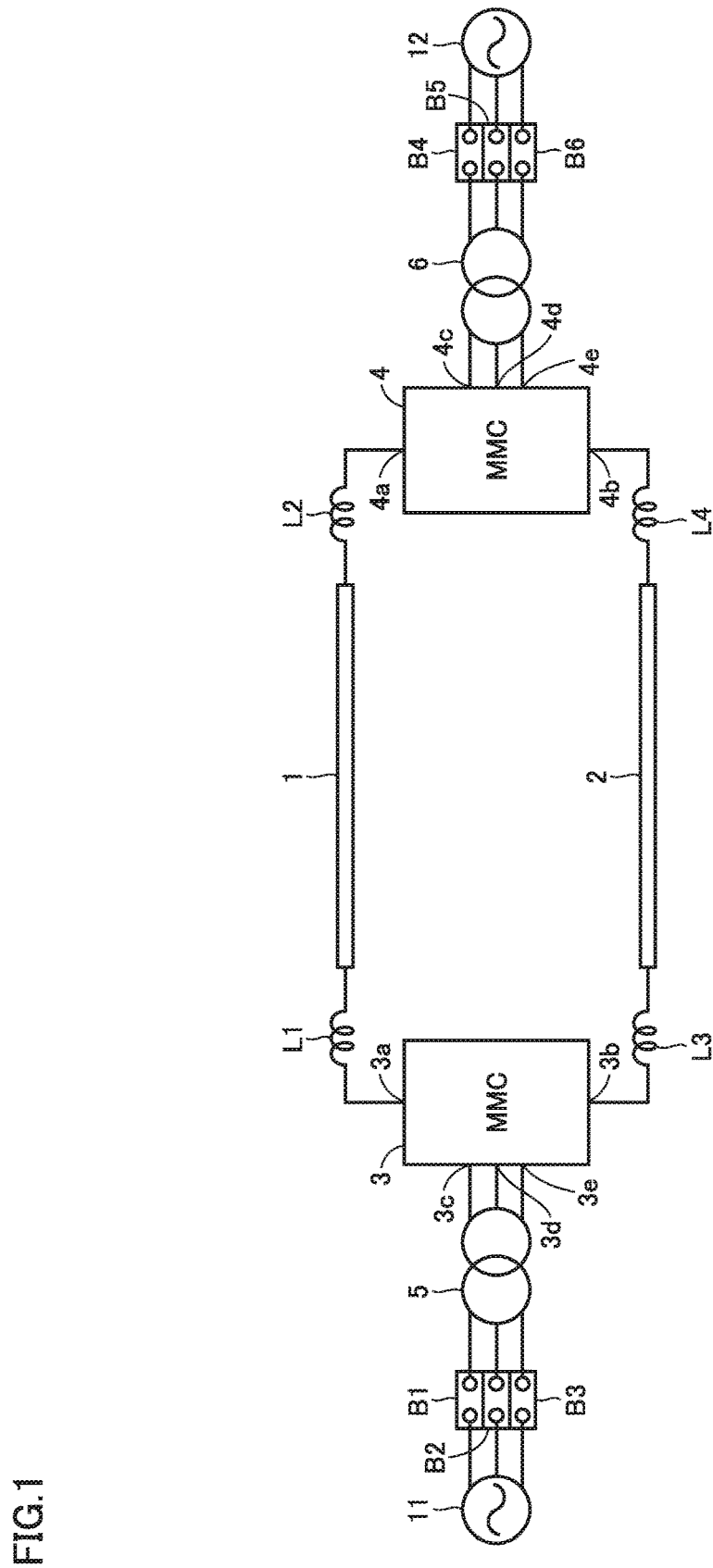
FIG. 1 is a circuit block diagram showing a configuration of a DC power transmission system according to a first embodiment of the present invention.

FIG. 1 is a circuit block diagram showing a configuration of a DC power transmission system according to a first embodiment of the present invention. In FIG. 1, the DC power transmission system includes DC power transmission lines 1, 2, interrupters B1 to B6, reactors L1 to L4, half bridge type modular multilevel converters (MMC) 3, 4, three-phase transformers 5, 6, and AC power systems 11, 12.

Multilevel converter 3 is a bidirectional power converter including a positive voltage terminal 3a (first DC terminal), a negative voltage terminal 3b (second DC terminal), and three AC terminals 3c to 3e, and is configured to convert one of DC power and three-phase AC power into the other of the DC power and the three-phase AC power. Positive voltage terminal 3a and negative voltage terminal 3b are used to transmit and receive the DC power, and three AC terminals 3c to 3e are used to transmit and receive the three-phase AC power.

Multilevel converter 4 is a bidirectional power converter including a positive voltage terminal 4a, a negative voltage terminal 4b, and three AC terminals 4c to 4e, and is configured to convert one of DC power and three-phase AC power into the other of the DC power and the three-phase AC power. Positive voltage terminal 4a and negative voltage terminal 4b are used to transmit and receive the DC power, and three AC terminals 4c to 4e are used to transmit and receive the three-phase AC power.

DC power transmission line 1 has one end connected to positive voltage terminal 3a of multilevel converter 3 via reactor L1, and has the other end connected to positive voltage terminal 4a of multilevel converter 4 via reactor L2.

DC power transmission line 2 has one end connected to negative voltage terminal 3b of multilevel converter 3 via reactor L3, and has the other end connected to negative voltage terminal 4b of multilevel converter 4 via reactor L4.

Each of DC power transmission lines 1, 2 is used to transmit DC power. Reactors L1, L3 are configured to suppress a signal, which is generated in multilevel converter 3 and has a switching frequency, from flowing to DC power transmission lines 1, 2. Reactors L2, L4 are configured to suppress a signal, which is generated in multilevel converter 4 and has a switching frequency, from flowing to DC power transmission lines 1, 2.

Three AC terminals 3c to 3e of multilevel converter 3 are connected to respective three secondary side terminals of three-phase transformer 5. Three-phase transformer 5 has three primary side terminals connected to respective three-phase power transmission lines of AC power system 11 via interrupters B1 to B3.

Three AC terminals 4c to 4e of multilevel converter 4 are connected to respective three secondary side terminals of three-phase transformer 6. Three-phase transformer 6 has three primary side terminals connected to respective three-phase power transmission lines of AC power system 12 via interrupters B4 to B6.

Three-phase transformer 5 transmits and receives the three-phase AC power between multilevel converter 3 and AC power system 11. Three-phase transformer 6 transmits and receives the three-phase AC power between multilevel converter 4 and AC power system 12. Interrupters B1 to B6 are in the conductive state during a normal operation, and are brought into the non-conductive state when a short circuit accident occurs between DC power transmission lines 1, 2 to protect the DC power transmission system, for example.

Next, the following describes an operation of the DC power transmission system. When supplying three-phase AC power from AC power system 11 to AC power system 12, the three-phase AC power of AC power system 11 is supplied to multilevel converter 3 via interrupters B1 to B3 and three-phase transformer 5 and is converted into DC power in multilevel converter 3. The DC power thus generated in multilevel converter 3 is supplied to multilevel converter 4 via DC power transmission lines 1, 2 and the like, and is converted into three-phase AC power in multilevel converter 4. The three-phase AC power generated in multilevel converter 4 is supplied to AC power system 12 via three-phase transformer 6 and interrupters B4 to B6.

On this occasion, a DC voltage between terminals 3a, 3b of multilevel converter 3 is set at a voltage slightly larger than a DC voltage between terminals 4a, 4b of multilevel converter 4, and the DC power is supplied from multilevel converter 3 to multilevel converter 4 via DC power transmission lines 1, 2 and the like.

Multilevel converter 3 operates as an AC/DC converter configured to convert the AC power, supplied from the AC power supply (AC power system 11, interrupters B1 to B3, and three-phase transformer 5), into DC power. Multilevel converter 4 operates as a DC/AC converter configured to convert the DC power, supplied from the DC power supply (multilevel converter 3 and the like), into AC power.

On the other hand, when supplying three-phase AC power from AC power system 12 to AC power system 11, the three-phase AC power of AC power system 12 is supplied to multilevel converter 4 via interrupters B4 to B6 and three-phase transformer 6 and is converted into DC power in multilevel converter 4. The DC power thus generated in multilevel converter 4 is supplied to multilevel converter 3 via DC power transmission lines 1, 2 and the like, and is converted into three-phase AC power in multilevel converter 3. The three-phase AC power generated in multilevel converter 3 is supplied to AC power system 11 via three-phase transformer 5 and interrupters B1 to B3.

On this occasion, a DC voltage between terminals 4a, 4b of multilevel converter 4 is set at a voltage slightly larger than a DC voltage between terminals 3a, 3b of multilevel converter 3, and the DC power is supplied from multilevel converter 4 to multilevel converter 3 via DC power transmission lines 1, 2 and the like.

Multilevel converter 4 operates as an AC/DC converter configured to convert the AC power, supplied from the AC power supply (AC power system 12, interrupters B4 to B6, and three-phase transformer 6), into DC power. Multilevel converter 3 operates as a DC/AC converter configured to convert the DC power, supplied from the DC power supply (multilevel converter 4 and the like), into AC power.

When a short circuit accident occurs between DC power transmission lines 1, 2, interrupters B1 to B6 are brought into the non-conductive state and the operations of multilevel converters 3, 4 are stopped, thereby protecting the DC power transmission system.

Figure 2:
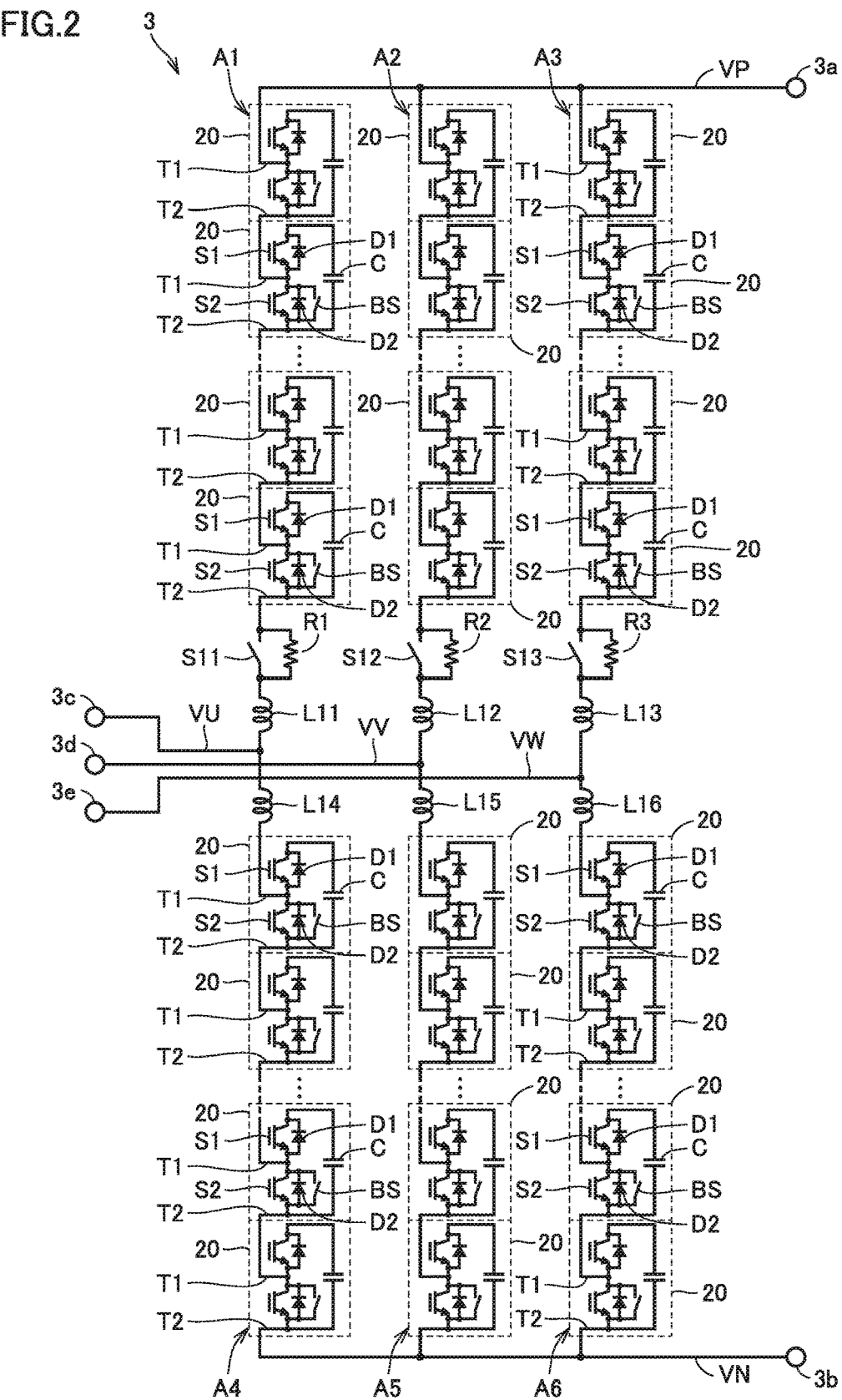
FIG. 2 is a circuit diagram showing a major portion of the multilevel converter shown in FIG. 1.

FIG. 2 is a circuit diagram showing a major portion of multilevel converter 3. In FIG. 2, multilevel converter 3 includes positive voltage terminal 3a, negative voltage terminal 3b, AC terminals 3c to 3e, arms A1 to A6, switches S11 to S13, resistive elements R1 to R3, and reactors L11 to L16.

Positive voltage terminal 3a is supplied with a positive DC voltage VP from multilevel converters 3, 4. Negative voltage terminal 3b is supplied with a negative DC voltage VN from multilevel converters 3, 4. AC terminal 3c is supplied with a U-phase AC voltage VU from three-phase transformer 5 and multilevel converter 3. AC terminal 3d is supplied with a V-phase AC voltage VV from three-phase transformer 5 and multilevel converter 3. AC terminal 3e is supplied with a W-phase AC voltage VW from three-phase transformer 5 and multilevel converter 3. The phases of three-phase AC voltages VU, VV, VW are shifted by 120°.

Arm A1, switch S11, and reactor L11 are connected in series between positive voltage terminal 3a and AC terminal 3c. Arm A2, switch S12, and reactor L12 are connected in series between positive voltage terminal 3a and AC terminal 3d. Arm A3, switch S13, and reactor L13 are connected in series between positive voltage terminal 3a and AC terminal 3e. Resistive elements R1 to R3 are respectively connected to switches S11 to S13 in parallel.

Switches S11 to S13 are in the conductive state during the normal operation, and are brought into the non-conductive state when a short circuit accident occurs in DC power transmission lines 1, 2. Resistive elements R1 to R3 quickly attenuate an inter-arm direct current flowing in arms A1 to A6 when the short circuit accident occurs in DC power transmission lines 1, 2 and switches S11 to S13 are brought into the non-conductive state. Reactors L11 to L13 suppress signals, which are generated in arms A1 to A3 and have the switching frequency, from flowing to AC terminals 3c to 3e.

Reactor L14 and arm A4 are connected in series between AC terminal 3c and negative voltage terminal 3b. Reactor L15 and arm A5 are connected in series between AC terminal 3d and negative voltage terminal 3b. Reactor L16 and arm A6 are connected in series between AC terminal 3e and negative voltage terminal 3b. Reactors L14 to L16 suppress signals, which are generated in arms A4 to A6 and have the switching frequency, from flowing to AC terminals 3c to 3e.

Figure 3:
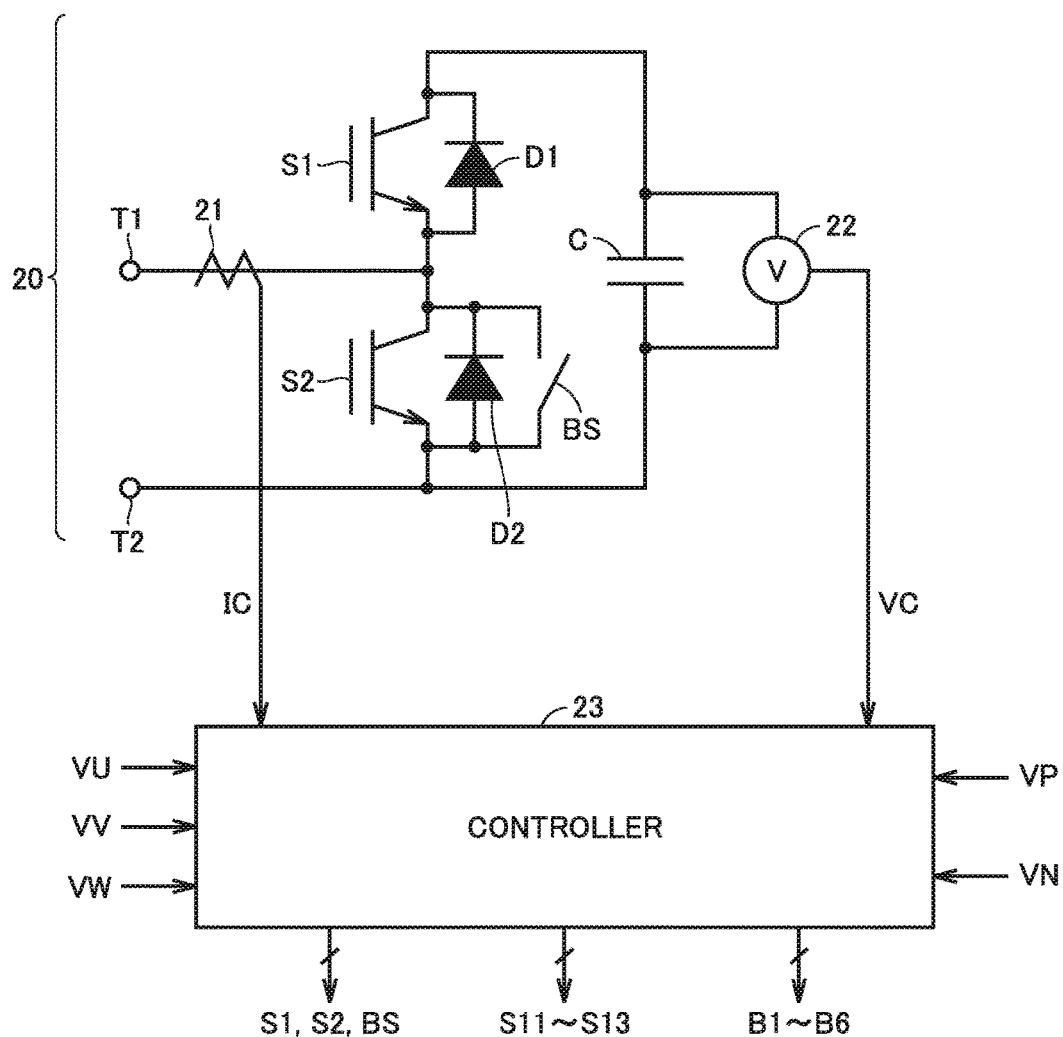
FIG. 3 is a circuit block diagram showing a configuration of a unit cell shown in FIG. 2 and a controller.
Figure 5A:
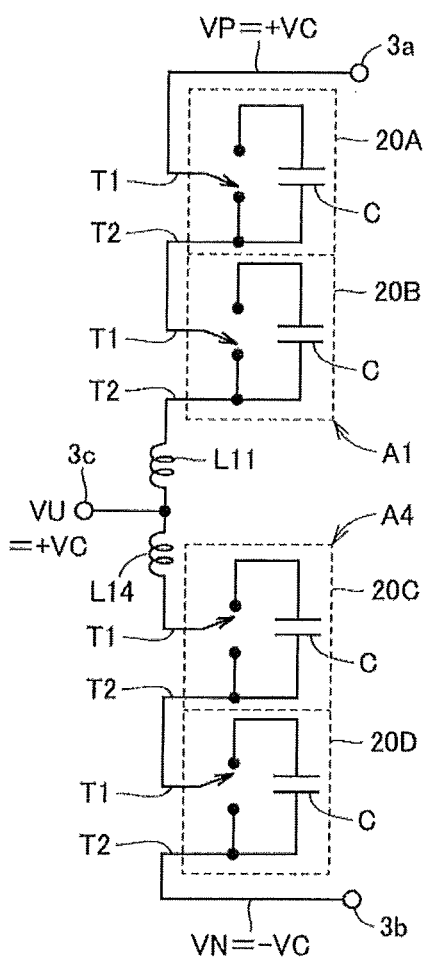
FIGS. 5(a), 5(b), 5(c) and 5(d) are a diagram showing an operation of the multilevel converter shown in FIG. 2.
Figure 5C:
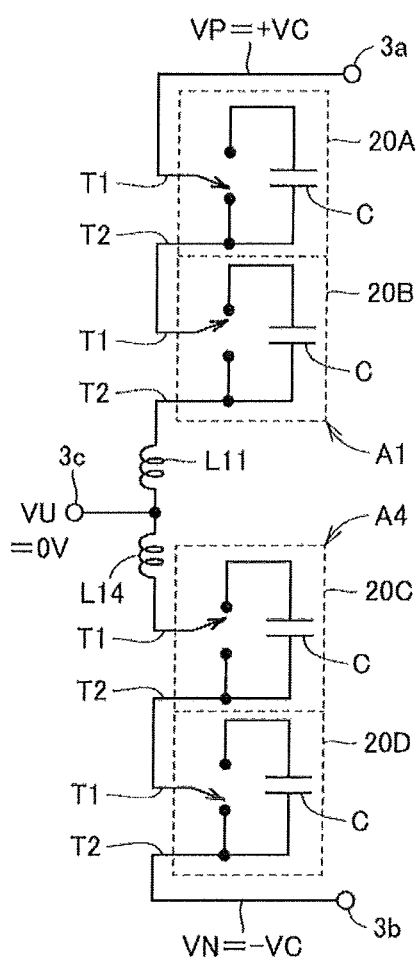
Figure 5B:
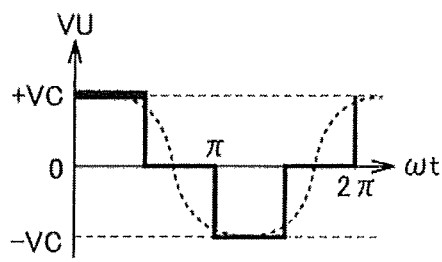
Figure 5D:
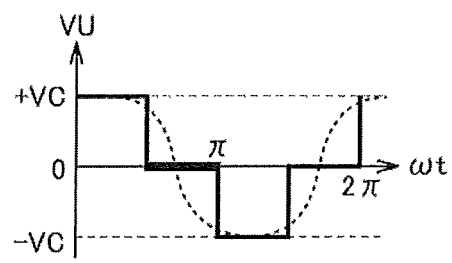
Figure 6A:
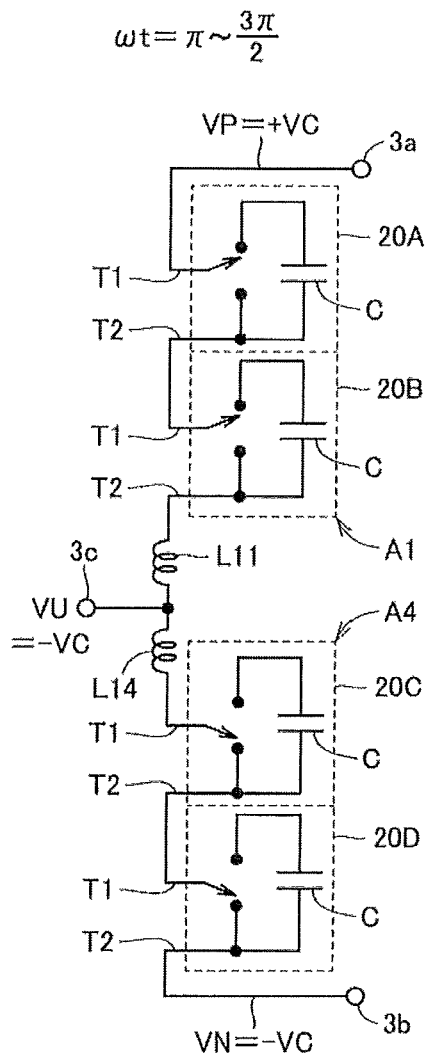
FIGS. 6(a), 6(b), 6(c) and 6(d) are another diagram showing the operation of the multilevel converter shown in FIG. 2.
Figure 6C:
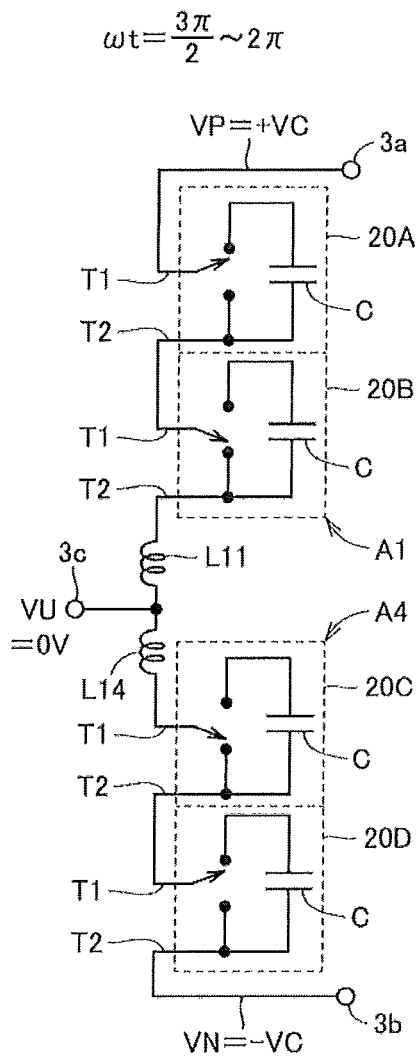
Figure 6B:
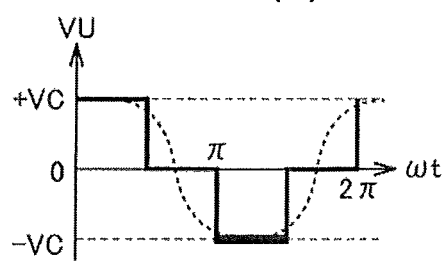
Figure 6D:
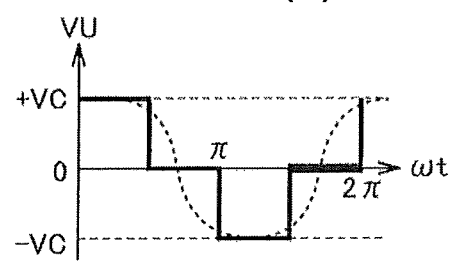

Each of arms A1 to A6 includes a plurality of unit cells 20 connected in cascade. As shown in FIG. 3, each of unit cells 20 includes a first terminal T1, a second terminal T2, a current detector 21, switching elements S1, S2, diodes D1, D2, a capacitor C, and a voltage detector 22. Moreover, multilevel converter 3 includes a controller 23 configured to control all the unit cells 20, all the switches S11 to S13, and the like.

Each of switching elements S1, S2 is constituted of an IGBT (Insulated Gate Bipolar Transistor), for example. Switching elements S1, S2 are connected in series between the positive and negative electrodes of capacitor C. That is, switching element S1 has a collector connected to the positive electrode of capacitor C and has an emitter connected to first terminal T1 and a collector of switching element S2, and switching element S2 has an emitter connected to second terminal T2 and the negative electrode of capacitor C.

Diodes D1, D2 are connected to switching elements S1, S2 in antiparallel, respectively. That is, diodes D1, D2 have anodes connected to respective emitters of switching elements S1, S2, and have cathodes connected to respective collectors of switching elements S1, S2. Each of diodes D1, D2 is a free wheel diode.

Current detector 21 detects an instantaneous value of current flowing between first terminal T1 and a node between switching elements S1, S2, and provides controller 23 with a signal indicating the detected value. Voltage detector 22 detects an instantaneous value of voltage VC between the electrodes of capacitor C, and provides controller 23 with a signal indicating the detected value.

As shown in FIG. 2, first terminals T1 of unit cells 20 of arms A1 to A3 at one end are connected to positive voltage terminal 3a. In each of arms A1 to A3, second terminals T2 of unit cells 20 are connected to first terminals T1 of unit cells 20 adjacent thereto in the direction of switches S11 to 13. Second terminals T2 of unit cells 20 of arms A1 to A3 at the other end are connected to respective terminals of switches S11 to S13 at one end.

First terminals T1 of unit cells 20 of arms A4 to A6 at one end are connected to respective terminals of reactors L14 to L16 at one end. In each of arms A4 to A6, second terminals T2 of unit cells 20 are connected to first terminals T1 of unit cells 20 adjacent thereto in the direction of negative voltage terminal 3b. Second terminals T2 of unit cells 20 of arms A4 to A6 at the other end are connected to negative voltage terminal 3b.

Controller 23 of FIG. 3 operates in synchronization with three-phase AC voltages VU, VV, VW from three-phase transformer 5, and controls switching elements S1, S2 of each unit cell 20 of arms A1 to A6 to convert the three-phase AC power from three-phase transformer 5 into DC power and supply it to DC power transmission lines 1, 2, or to convert the DC power from DC power transmission lines 1, 2 into three-phase AC power and supply it to three-phase transformer 5. On this occasion, controller 23 controls switching elements S1, S2 based on a result of the detection by voltage detector 22 of each unit cell 20 to charge capacitor C of each unit cell 20 to a predetermined DC voltage.

Further, based on the result of the detection by current detector 21 of each unit cell 20, controller 23 determines whether or not a short circuit accident has occurred in DC power transmission lines 1, 2. When the short circuit accident has occurred, controller 23 controls switching elements S1, S2 of each unit cell 20 to come into the non-conductive state. When switching elements S1, S2 are brought into the non-conductive state, the short-circuit current flowing in switching element S2 is transferred to diode D2, thereby protecting switching elements S1, S2.

Next, controller 23 controls a mechanical bypass switch BS to come into the conductive state. When mechanical bypass switch BS is brought into the conductive state, the short-circuit current flowing in diode D2 is transferred to mechanical bypass switch BS, thereby protecting diode D2.

Moreover, controller 23 controls interrupters B1 to B6 and switches S11 to S13 to come into the non-conductive state. When interrupters B1 to B6 are brought into the non-conductive state, AC power systems 11, 12 are electrically disconnected from three-phase transformers 5, 6, thereby interrupting the supplying of AC power to multilevel converter 3. Accordingly, the supplying of line direct current from multilevel converter 3 to DC power transmission lines 1, 2 is interrupted, whereby the line direct current (see FIG. 10) is attenuated by arc resistance of the point of accident.

Moreover, when interrupters B1 to B6 are brought into the non-conductive state, AC power systems 11, 12 are electrically disconnected from three-phase transformers 5, 6, thereby interrupting the three-phase short circuit current (see FIG. 9) flowing from the U-phase secondary terminal of three-phase transformer 5 to the V phase secondary terminal of three-phase transformer 5 via arms A1 and A2, for example.

When switches S11 to S13 are brought into the non-conductive state, current flowing in arms A1 to A3 flow into resistive elements R1 to R3, thereby quickly attenuating the inter-arm direct current (see FIG. 10) circulating in a path including arms A1, A2, A5, A4 or the like, for example.

Next, the normal operation of multilevel converter 3 will be described. During the normal operation, each unit cell 20 is in the ON state or the OFF state. In unit cell 20 in the ON state, switching element S1 is in the conductive state and switching element S2 is in the non-conductive state, and terminals T1, T2 are respectively connected to the positive and negative electrodes of capacitor C as shown in FIG. 4 (a). When capacitor C has been charged to DC voltage VC, DC voltage VC is output between terminals T1, T2.

In unit cell 20 in the OFF state, switching element S1 is in the non-conductive state and switching element S2 is in the conductive state, and terminals T1, T2 are connected to each other and 0 V is output between terminals T1, T2 as shown in FIG. 4 (b). When capacitor C has been charged to DC voltage VC, the state is maintained.

Each of FIGS. 5 (a) to (d) and FIG. 6 (a) to (d) shows the normal operation of multilevel converter 3. Each of FIGS. 5 (a) to (d) and FIGS. 6 (a) to (d) only shows a portion thereof in connection with U-phase AC voltage VU for simplification of the drawings and description. Arm A1 includes only two unit cells 20A, 20B, and arm A4 includes only two unit cells 20C, 20D. During the normal operation, switch S11 is in the conductive state, so that switch S11 and resistive element R1 are not illustrated in the figures.

It is assumed that capacitors C of unit cells 20A to 20D have been charged to predetermined DC voltage VC. Positive DC voltage VP=+VC is applied to positive voltage terminal 3a, and negative DC voltage VN=−VC is applied to negative voltage terminal 3b. Multilevel converter 3 outputs three-level AC voltage VU including +VC, 0 V, and −VC. It is assumed that AC voltage VU is represented by a function of ωt and that one period of AC voltage VU is 2π.

During a period from ωt=0 to (π/2), unit cells 20A, 20B are in the OFF state and unit cells 20C, 20D are in the ON state as shown in FIGS. 5 (a) and (b). Accordingly, DC voltage VP=+VC of positive voltage terminal 3a is output to AC terminal 3c via unit cells 20A, 20B and reactor L11, whereby voltage VU of the AC terminal 3c becomes +VC. Between AC terminal 3c and negative voltage terminal 3b, reactor L14 and capacitors C of unit cells 20C, 20D are connected in series, whereby voltage VU of AC terminal 3c is maintained at +VC.

During a period from ωt=(π/2) to 7C, as shown in FIGS. 5 (c) and (d), unit cells 20A, 20D are in the OFF state and unit cells 20B, 20C are in the ON state. Accordingly, capacitor C of unit cell 20B and reactor L11 are connected in series between positive voltage terminal 3a and AC terminal 3c, and reactor L14 and capacitor C of unit cell 20C are connected in series between AC terminal 3c and negative voltage terminals 3b, whereby voltage VU of AC terminal 3c becomes 0 V.

During a period from ωt=π to (3π/2), unit cells 20A, 20B are in the ON state and unit cells 20C, 20D are in the OFF state as shown in FIGS. 6 (a) and (b). Accordingly, DC voltage VN=−VC of negative voltage terminal 3b is output to AC terminal 3c via unit cells 20D, 20C and reactor L14, whereby voltage VU of AC terminal 3c becomes −VC. Capacitors C of unit cells 20A, 20B and reactor L11 are connected in series between positive voltage terminal 3a and AC terminals 3c, whereby voltage VU of AC terminal 3c is maintained at −VC.

During a period from ωt=(3π/2) to 2π, unit cells 20A, 20D are in the ON state and unit cells 20B, 20C are in the OFF state as shown in FIGS. 6 (c) and (d). Accordingly, capacitor C of unit cell 20A and reactor L11 are connected in series between positive voltage terminal 3a and AC terminals 3c, and reactor L14 and capacitor C of unit cell 20D are connected in series between AC terminal 3c and negative voltage terminal 3b, whereby voltage VU of AC terminal 3c becomes 0 V.

In this way, DC voltages VP=+VC and VN=−VC are converted into the three-level AC voltage VU. The waveform of AC voltage VU can be formed into a sinusoidal wave by increasing the number of unit cells 20 in each arm.

When the phases of three-phase AC voltages VU, VV, VW generated in multilevel converter 3 are advanced with respect to the phases of the three-phase AC voltage output from three-phase transformer 5, AC power having a value corresponding to a phase difference therebetween is supplied from multilevel converter 3 to three-phase transformer 5. In this case, multilevel converter 3 operates as a DC/AC converter configured to convert the DC power from DC power transmission lines 1, 2 into AC power and supply it to three-phase transformer 5.

On the other hand, when the phases of three-phase AC voltages VU, VV, VW generated in multilevel converter 3 are delayed with respect to the phases of the three-phase AC voltage output from three-phase transformer 5, AC power having a value corresponding to a phase difference therebetween is supplied from three-phase transformer 5 to multilevel converter 3. In this case, multilevel converter 3 operates as an AC/DC converter configured to convert the AC power from three-phase transformer 5 into DC power and supply it to DC power transmission lines 1, 2. The configuration and operation of multilevel converter 4 are the same as those of multilevel converter 3, and are therefore not described repeatedly.

Figure 7:
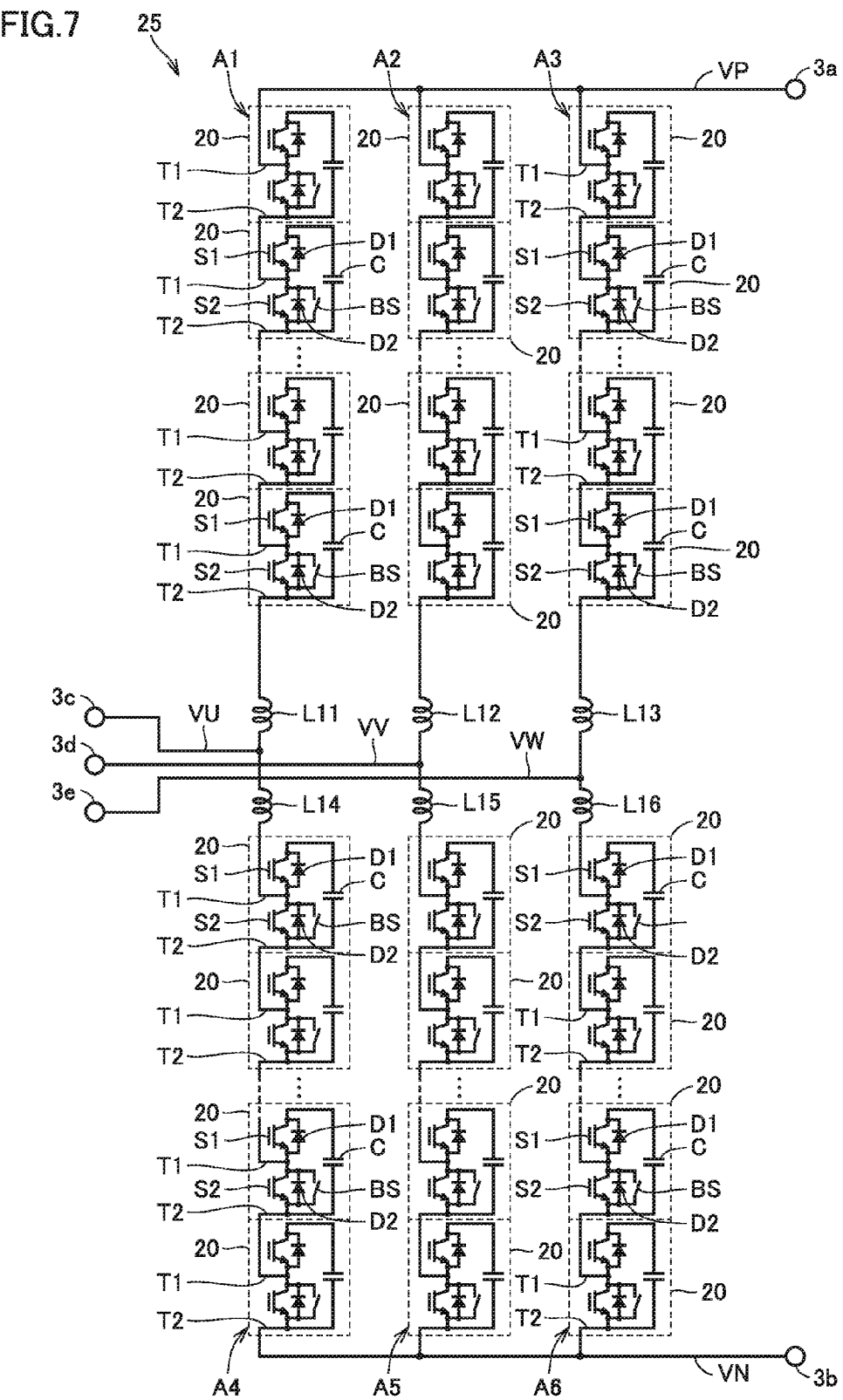
FIG. 7 is a circuit diagram showing a major portion of a multilevel converter included in a DC power transmission system serving as a comparative example for the first embodiment.

FIG. 7 is a circuit diagram showing a major portion of a multilevel converter 25 included in a DC power transmission system serving as a comparative example for the first embodiment, and is a diagram compared with FIG. 2. With reference to FIG. 7, multilevel converter 25 is different from multilevel converter 3 of FIG. 2 in that switches S11 to S13 and resistive elements R1 to R3 are omitted.

Arm A1 and reactor L11 are connected in series between positive voltage terminal 3a and AC terminal 3c. Arm A2 and reactor L12 are connected in series between positive voltage terminal 3a and AC terminal 3d. Arm A3 and reactor L13 are connected in series between positive voltage terminal 3a and AC terminal 3e.

Figure 8:
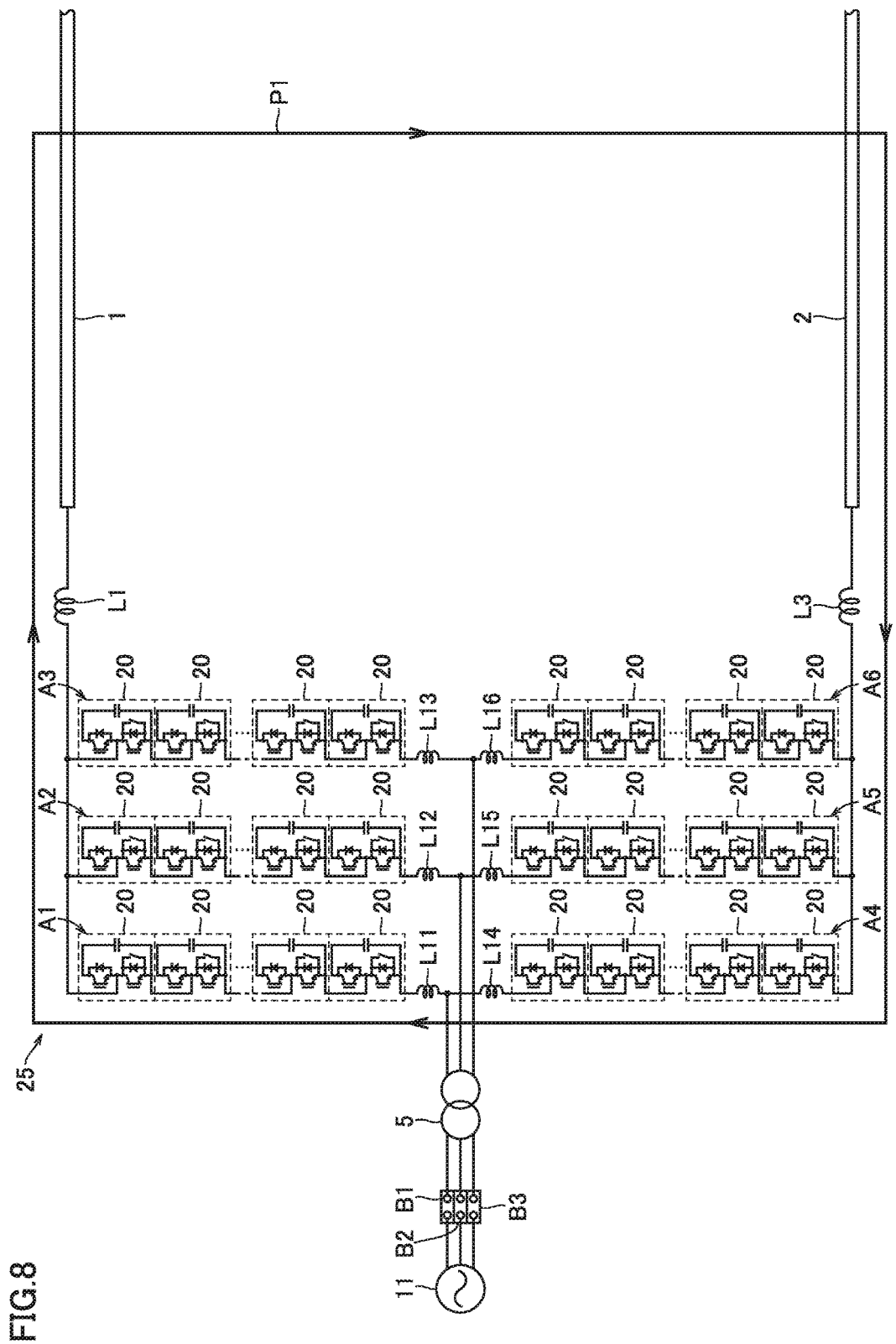
FIG. 8 is a circuit diagram showing a line direct current flowing in the DC power transmission system including the multilevel converter shown in FIG. 7 upon occurrence of a short circuit accident.

When a short circuit accident occurs in DC power transmission lines 1, 2 in the DC power transmission system including such a multilevel converter 25, a line direct current (short-circuit current) flows in a path P1 as shown in FIG. 8, for example. That is, the line direct current flows in path P1 including DC power transmission line 1, a short circuit portion (not shown), DC power transmission line 2, reactor L3, arm A4, reactor L14, reactor L11, arm A1, reactor L1, and DC power transmission line 1. The line direct current may flow also in arms A5, A6, reactors L15, L16, reactors L12, L13 and arms A2, A3. Such a line direct current can be interrupted by bringing interrupters B1 to B6 into the non-conductive state.

Figure 9:
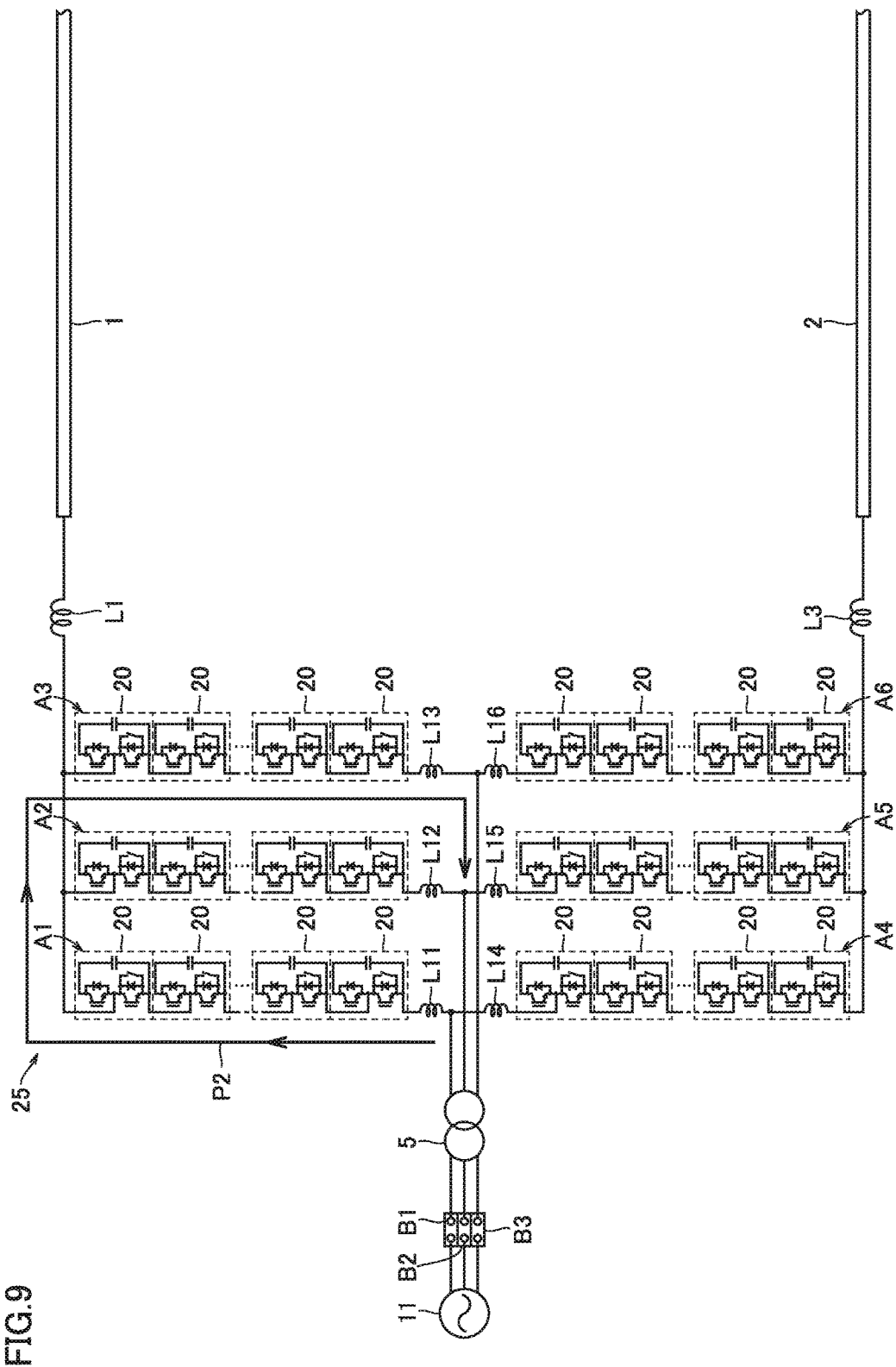
FIG. 9 is a circuit diagram showing a three-phase short circuit current flowing in the DC power transmission system including the multilevel converter shown in FIG. 7 upon occurrence of a short circuit accident.

Moreover, when mechanical bypass switch BS of each unit cell 20 is brought into the conductive state, the three secondary terminals of three-phase transformer 5 are short-circuited, with the result that three-phase short circuit current flows in a path P2 as shown in FIG. 9, for example. The three-phase short circuit current flows in path P2 including the U-phase secondary terminal of three-phase transformer 5, reactor L11, arms A1, A2, reactor L12, and the V-phase secondary terminal of three-phase transformer 5, for example. Further, the three-phase short circuit current may flow in a path including the U-phase secondary terminal of three-phase transformer 5, reactor L11, arms A1, A3, reactor L13, and the V-phase secondary terminal of three-phase transformer 5. Such a three-phase short circuit current can be interrupted by bringing interrupters B1 to B6 into the non-conductive state.

Figure 10:
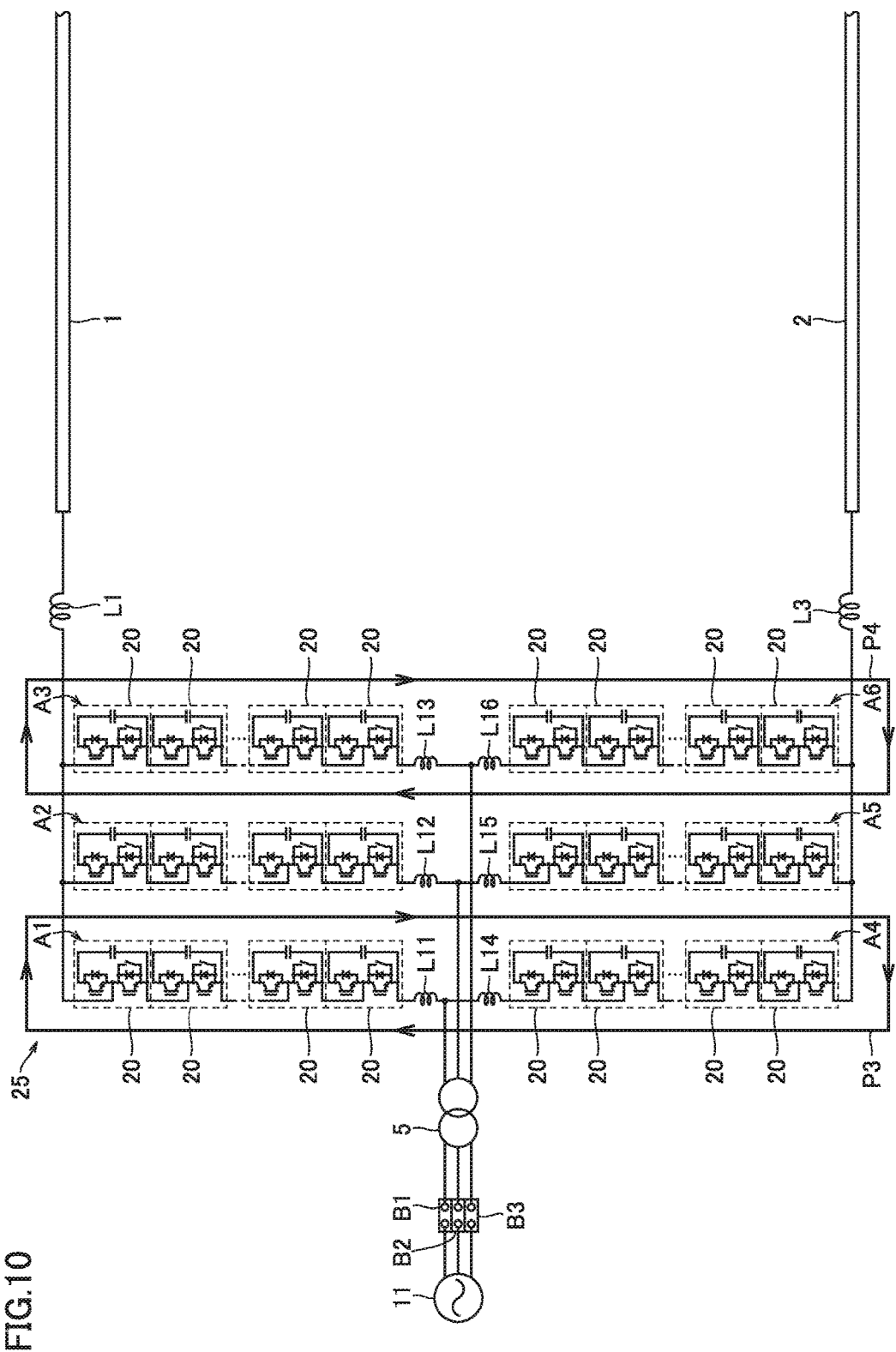
FIG. 10 is a circuit diagram showing an inter-arm direct current flowing in the DC power transmission system including the multilevel converter shown in FIG. 7 upon occurrence of a short circuit accident.

Furthermore, when mechanical bypass switch BS of each unit cell 20 is brought into the conductive state, electromagnetic energy accumulated in reactors L11 to L16 is released, with the result that inter-arm direct currents are circulated in paths P3, P4 as shown in FIG. 10, for example. That is, the inter-arm direct current flows in path P3 including reactor L11, arm A1, A2, reactor L12, L15, arm A5, A4, and reactor L14. The inter-arm direct current flows in path P4 including reactor L12, arms A2, A3, reactors L13, L16, arms A6, A5, and reactor L15.

In multilevel converter 25 of the comparative example, each of the inter-arm direct currents shown in FIG. 10 cannot be interrupted, so that it is necessary to wait for the inter-arm direct current to be attenuated by the resistance component of the circuit. The inter-arm direct current continues to flow in current path P3 while being attenuated at a time constant determined by a ratio of inductance to resistance value of current path P3, for example. In such a DC power transmission system, the resistance component is made small in order to reduce loss, so that the attenuation time constant for the inter-arm direct current is large. Therefore, when a short circuit accident occurs, the DC power transmission system cannot be restarted quickly.

On the other hand, in the first embodiment, switches S11 to S13 of FIG. 2 are brought into the non-conductive state, thereby quickly attenuating the inter-arm direct current by resistive elements R1 to R3. Therefore, when a short circuit accident occurs, the DC power transmission system can be restarted quickly.

Figure 11:
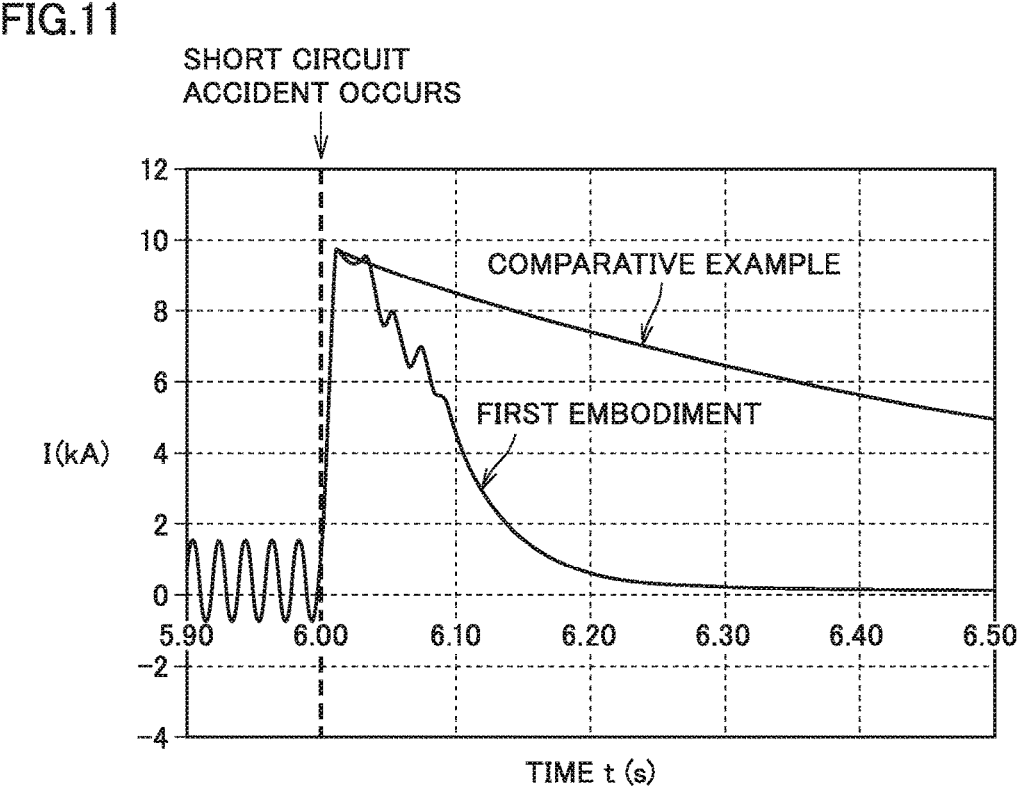
FIG. 11 is a time chart showing the inter-arm direct current in each of the first embodiment and the comparative example.

FIG. 11 is a time chart showing a change of inter-arm direct current I with time in each of the first embodiment and the comparative example. In FIG. 11, in the comparative example, even 0.5 second after occurrence of a short circuit accident, inter-arm direct current I is decreased only to a value about the half of the peak value. On the other hand, in the first embodiment, 0.5 second after occurrence of a short circuit accident, inter-arm direct current I is decreased to 0 A. Accordingly, according to the first embodiment, the inter-arm direct current flowing upon the occurrence of the short circuit accident can be attenuated quickly, whereby the DC power transmission system can be restarted quickly even when the short circuit accident occurs.

It should be noted that in this first embodiment, a parallel connection body constituted of switch S11 and resistive element R1 is provided between arm A1 and reactor L11; however, it is not limited to this and the parallel connection body may be provided in any location between positive voltage terminal 3a and negative voltage terminal 3b. For example, the parallel connection body constituted of switch S11 and resistive element R1 may be connected between reactor L14 and arm A4. Moreover, parallel connection bodies each constituted of switch S11 and resistive element R1 may be connected between arm A1 and reactor L11 and between reactor L14 and arm A4. The same applies to a parallel connection body constituted of switch S12 and resistive element R2 and a parallel connection body constituted of switch S13 and resistive element R3.

Moreover, in the first embodiment, first terminal T1 and second terminal T2 of unit cell 20 are respectively connected to the collector and emitter of switching element S2 and mechanical bypass switch BS is connected to diode D2 in parallel; however, it is not limited to this, and the same result is obtained when first terminal T1 and second terminal T2 of unit cell 20 are respectively connected to the collector and emitter of switching element S1 and mechanical bypass switch BS is connected to diode D1 in parallel.

Second Embodiment

Figure 12:
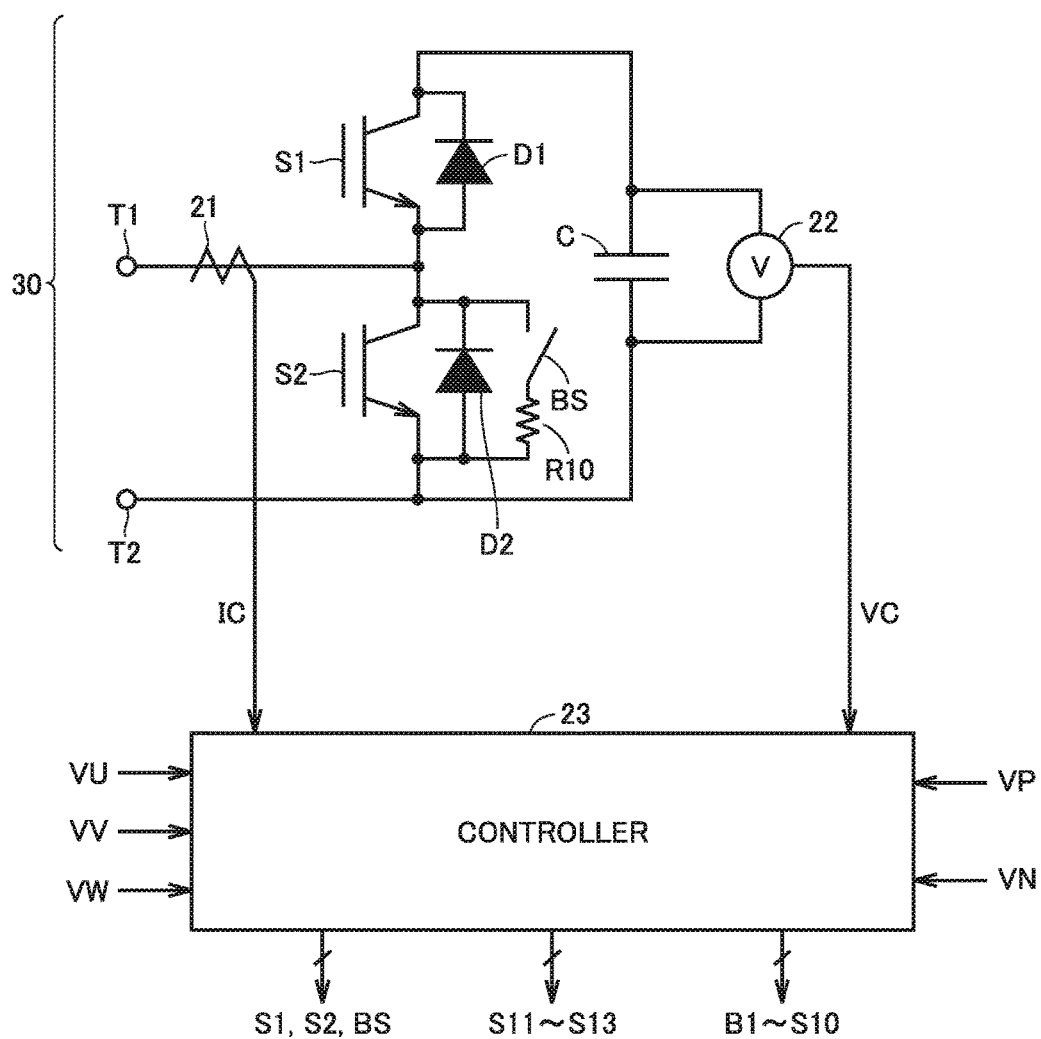
FIG. 12 is a circuit block diagram showing a configuration of a unit cell included in a multilevel converter of a DC power transmission system according to a second embodiment of the present invention.

FIG. 12 is a circuit block diagram showing a major portion of a multilevel converter included in a DC power transmission system according to a second embodiment of the present invention, and is a diagram compared with FIG. 3. With reference to FIG. 12, the multilevel converter of the second embodiment is different from multilevel converter 3 of the first embodiment in that each unit cell 20 of FIG. 2 is replaced with a unit cell 30 and switches S11 to S13 and resistive elements R1 to R3 are omitted. In other words, the multilevel converter of the second embodiment is different from multilevel converter 25 of the comparative example in that each unit cell 20 of FIG. 7 is replaced with unit cell 30.

Unit cell 30 is obtained by adding a resistive element R10 to unit cell 20. Mechanical bypass switch BS and resistive element R10 are connected in series between the cathode and anode of diode D2.

In the DC power transmission system including the multilevel converter of the second embodiment, the inter-arm direct current shown in FIG. 10 flows when a short circuit accident occurs in DC power transmission lines 1, 2 and mechanical bypass switch BS of each unit cell 30 is brought into the conductive state. This inter-arm direct current is quickly attenuated by resistive element R10 of each unit cell 30.

In this second embodiment, the inter-arm direct current flowing upon the occurrence of the short circuit accident can be attenuated quickly by resistive element R10, whereby the DC power transmission system can be restarted quickly even when the short circuit accident occurs.

It should be noted that if the resistance value of resistive element R10 is too large, the whole of the inter-arm direct current cannot be transferred to mechanical bypass switch BS and resistive element R10 even when mechanical bypass switch BS is brought into the conductive state, with the result that a portion of the inter-arm direct current continues to flow in diode D2. Accordingly, diode D2 may not be protected. Therefore, in consideration of on resistance value and voltage decrease of diode D2, the resistance value of resistive element R10 needs to be selected not to adversely affect protection of diode D2.

Moreover, in this second embodiment, first terminal T1 and second terminal T2 of unit cell 30 are respectively connected to the collector and emitter of switching element S2, and mechanical bypass switch BS and resistive element R10 are connected in series between the cathode and anode of diode D2, but it is not limited to this. The same result is obtained when first terminal T1 and second terminal T2 of unit cell 20 are respectively connected to the collector and emitter of switching element S1 and mechanical bypass switch BS and resistive element R10 are connected in series between the cathode and anode of diode D1.

Third Embodiment

Figure 13:
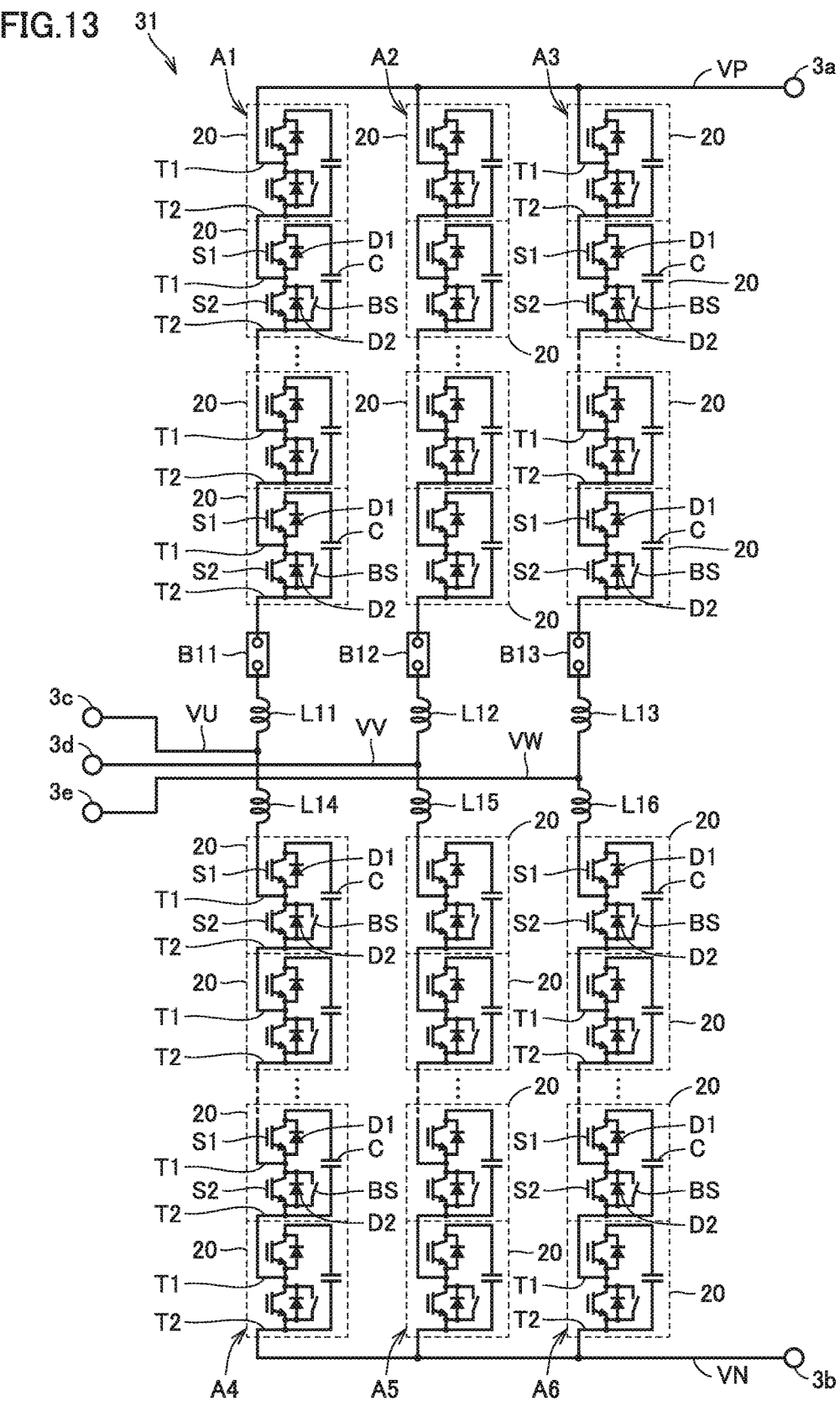
FIG. 13 is a circuit diagram showing a major portion of a multilevel converter included in a DC power transmission system according to a third embodiment of the present invention.

FIG. 13 is a circuit block diagram showing a major portion of a multilevel converter 31 included in a DC power transmission system according to a third embodiment of the present invention, and is a diagram compared with FIG. 2. With reference to FIG. 13, this multilevel converter 31 is different from multilevel converter 3 of FIG. 2 in that switches S11 to S13 and resistive elements R1 to R3 are replaced with interrupters B11 to B13.

Arm A1, interrupter B11, and reactor L11 are connected in series between positive voltage terminal 3a and AC terminal 3c. Arm A2, interrupter B12, and reactor L12 are connected in series between positive voltage terminal 3a and AC terminal 3d. Arm A3, interrupter B13, and reactor L13 are connected in series between positive voltage terminal 3a and AC terminal 3e. Interrupters B11 to B13 are controlled by controller 23 shown in FIG. 3, and are in the conductive state during the normal operation, and are brought into the non-conductive state when a short circuit accident occurs in DC power transmission lines 1, 2.

In the DC power transmission system including this multilevel converter 31, the inter-arm direct current shown in FIG. 10 flows when a short circuit accident occurs in DC power transmission lines 1, 2 and mechanical bypass switch BS of each unit cell 20 is brought into the conductive state. When interrupters B11 to B13 are brought into the non-conductive state by controller 23, the inter-arm direct current is interrupted.

In this third embodiment, the inter-arm direct current flowing upon the occurrence of the short circuit accident can be interrupted quickly by interrupters B11 to B13, whereby the DC power transmission system can be restarted quickly even when the short circuit accident occurs.

It should be noted that in this third embodiment, interrupter B11 is provided between arm A1 and reactor L11; however, it is not limited to this and interrupter B11 may be provided in any location between positive voltage terminal 3a and negative voltage terminal 3b. For example, interrupter B11 may be connected between reactor L14 and arm A4. Moreover, interrupters B11 may be connected between arm A1 and reactor L11 and between reactor L14 and arm A4. The same applies to each of interrupters B12, B13.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 2: DC power transmission line; B1 to B6: interrupter; L1 to L4, L11 to L16: reactor; 3, 4, 25, 31: half bridge type modular multilevel converter; 3a, 4a: positive voltage terminal; 3b, 4b: negative voltage terminal; 3c to 3e, 4c to 4e: AC terminal; 5, 6: three-phase transformer; 11, 12: AC power system; A1 to A6: arm; S11 to S13: switch; R1 to R3, R10: resistive element; 20, 30: unit cell; T1: first terminal; T2: second terminal; 21: current detector; S1, S2: switching element; D1, D2: diode; BS: mechanical bypass switch; C: capacitor; 22: voltage detector; 23: controller.

The invention claimed is:

1. A power converter configured to transmit and receive power between an AC power supply and a DC power supply, the power converter comprising:
    first and second DC terminals configured to transmit and receive DC power to and from the DC power supply;
    an AC terminal configured to transmit and receive AC power to and from the AC power supply;
    a first arm connected between the first DC terminal and the AC terminal;
    a second arm connected between the AC terminal and the second DC terminal,
        each of the first and second arms including a plurality of unit cells connected in cascade,
        each unit cell including a capacitor, first and second switching elements, first and second diodes, and a mechanical bypass switch, the capacitor being configured to be charged to a predetermined DC voltage, the first and second switching elements being connected in series between electrodes of the capacitor, the first and second diodes being respectively connected to the first and second switching elements in antiparallel, the mechanical bypass switch being connected to the first or second diode in parallel,
        the mechanical bypass switches of the plurality of unit cells being connected in series in each of the first and second arms,
        the first and second switching elements of each unit cell being configured to alternately come into a conductive state during a normal operation, both the first and second switching elements of each unit cell being configured to come into a non-conductive state when a short circuit accident occurs at the DC power supply side,
the mechanical bypass switch of each unit cell being configured to be in the non-conductive state during the normal operation, the mechanical bypass switch of each unit cell being configured to come into the conductive state when the short circuit accident occurs;
a switch connected between the first and second DC terminals in series with the first and second arms, the switch being configured to be in the conductive state during the normal operation, the switch being configured to come into the non-conductive state when the short circuit accident occurs; and
a resistive element connected to the switch in parallel, the resistive element being configured to attenuate a current flowing in the first and second arms when the switch is brought into the non-conductive state.

2. The power converter according to claim 1, further comprising:
a current detector configured to detect the current flowing in the first and second arms; and
a controller configured to determine, based on a result of the detection by the current detector, whether or not the short circuit accident has occurred, and to control each unit cell and the switch based on a result of the determination.

3. The power converter according to claim 1, wherein the AC power is three-phase AC power, and
three groups each including the AC terminal, the first arm, the second arm, the switch, and the resistive element are provided.

4. A power converter configured to transmit and receive power between an AC power supply and a DC power supply, the power converter comprising:
first and second DC terminals configured to transmit and receive DC power to and from the DC power supply;
an AC terminal configured to transmit and receive AC power to and from the AC power supply;
a first arm connected between the first DC terminal and the AC terminal; and
a second arm connected between the AC terminal and the second DC terminal,
each of the first and second arms including a plurality of unit cells connected in cascade,
each unit cell including a capacitor, first and second switching elements, first and second diodes, and a mechanical bypass switch, the capacitor being configured to be charged to a predetermined DC voltage, the first and second switching elements being connected in series between electrodes of the capacitor, the first and second diodes being respectively connected to the first and second switching elements in antiparallel, the mechanical bypass switch being connected to the first or second diode in parallel,
the mechanical bypass switches of the plurality of unit cells being connected in series in each of the first and second arms,
the first and second switching elements of each unit cell being configured to alternately come into a conductive state during a normal operation, both the first and second switching elements of each unit cell being configured to come into a non-conductive state when a short circuit accident occurs at the DC power supply side,
the mechanical bypass switch of each unit cell being configured to be in the non-conductive state during the normal operation, the mechanical bypass switch of each unit cell being configured to come into the conductive state when the short circuit accident occurs,
each unit cell further including a resistive element connected between cathode and anode of the first or second diode in series with the mechanical bypass switch, the resistive element being configured to attenuate a current flowing in the first and second arms when the mechanical bypass switch is brought into the conductive state.

5. The power converter according to claim 4, further comprising:
a current detector configured to detect the current flowing in the first and second arms; and
a controller configured to determine, based on a result of the detection by the current detector, whether or not the short circuit accident has occurred, and to control each unit cell based on a result of the determination.

6. The power converter according to claim 4, wherein the AC power is three-phase AC power, and
three groups each including the AC terminal, the first arm, and the second arm are provided.

7. A power converter configured to transmit and receive power between an AC power supply and a DC power supply, the power converter comprising:
first and second DC terminals configured to transmit and receive DC power to and from the DC power supply;
an AC terminal configured to transmit and receive AC power to and from the AC power supply;
a first arm connected between the first DC terminal and the AC terminal;
a second arm connected between the AC terminal and the second DC terminal,
each of the first and second arms including a plurality of unit cells connected in cascade,
each unit cell including a capacitor, first and second switching elements, first and second diodes, and a mechanical bypass switch, the capacitor being configured to be charged to a predetermined DC voltage, the first and second switching elements being connected in series between electrodes of the capacitor, the first and second diodes being respectively connected to the first and second switching elements in antiparallel, the mechanical bypass switch being connected to the first or second diode in parallel,
the mechanical bypass switches of the plurality of unit cells being connected in series in each of the first and second arms,
the first and second switching elements of each unit cell being configured to alternately come into a conductive state during a normal operation, both the first and second switching elements of each unit cell being configured to come into a non-conductive state when a short circuit accident occurs at the DC power supply side,
the mechanical bypass switch of each unit cell being configured to be in the non-conductive state during the normal operation, the mechanical bypass switch of each unit cell being configured to come into the conductive state when the short circuit accident occurs; and
an interrupter connected between the first and second DC terminals in series with the first and second arms, the interrupter being configured to be in the conductive state during the normal operation, the interrupter being configured to come into the non-conductive state to interrupt a current flowing in the first and second arms when the short circuit accident occurs.

8. The power converter according to claim 7, further comprising:
a current detector configured to detect the current flowing in the first and second arms; and
a controller configured to determine, based on a result of the detection by the current detector, whether or not the short circuit accident has occurred, and to control each unit cell and the interrupter based on a result of the determination.

9. The power converter according to claim 7, wherein
the AC power is three-phase AC power, and
three groups each including the AC terminal, the first arm, the second arm, and the interrupter are provided.

* * * * *